United States Patent [19]
Hinch

[11] Patent Number: 5,611,459
[45] Date of Patent: Mar. 18, 1997

[54] METHOD OF CONVERTING AN INVERTED BOTTLE WATER DISPENSING SYSTEM FOR USE WITH AN AUTOMATIC BOTTLE REFILL SYSTEM

[75] Inventor: Nowell Hinch, 11249-127 Street, Edmonton, Alberta, Canada, T5M 0T7

[73] Assignees: Eaucool Canada Inc., Calgary; Nowell Hinch, Edmonton, both of Canada

[21] Appl. No.: 501,367

[22] Filed: Jul. 12, 1995

[51] Int. Cl.$^6$ ....................................................... B67D 5/08
[52] U.S. Cl. ........................................... 222/67; 222/185.1
[58] Field of Search ............................. 222/1, 67, 185.1, 222/146.6; 141/364

[56] References Cited

U.S. PATENT DOCUMENTS

| | | | |
|---|---|---|---|
| 3,966,093 | 7/1976 | Frahm et al. | 222/185 |
| 4,116,128 | 9/1978 | Lehmann et al. | 222/67 |
| 4,757,921 | 7/1988 | Snowball | 222/146.6 |
| 4,805,808 | 2/1989 | Larson | 222/185.1 |
| 4,881,661 | 11/1989 | Jones | 222/67 |
| 4,972,976 | 11/1990 | Romero | 222/185.1 |
| 5,121,778 | 6/1992 | Baker et al. | 141/319 |
| 5,533,651 | 7/1996 | Eddy et al. | 222/185.1 |

Primary Examiner—Andres Kashnikow
Assistant Examiner—Phillippe Derakshani
Attorney, Agent, or Firm—Anthony R. Lambert

[57] ABSTRACT

A method of converting an inverted bottle water dispensing system for use with an automatic bottle refill mechanism. The inverted bottle water dispensing system to which the method relates an open topped cooling reservoir with a mounting adaptor for receiving an inverted bottle water disposed on top of the reservoir. The automatic bottle refill mechanism to which the method relates has a conduit connected to the inverted water bottle and connected to a float valve positioned within the inverted water bottle. The conduit is connected to a pressurized water service so that a continuous replenishing supply of water is supplied as permitted by the float valve. The method includes the step of permanently securing across the open top of the cooling reservoir a rigid closure cap to which a bottom of the mounting adaptor has been permanently secured. The rigid closure cap has a single access opening in liquid communication with the bottom of the mounting adaptor. The method, as described, is intended to reduce or eliminate the possibility of catastrophic leakage in an inverted bottle water dispensing system connected to an automatic bottle refill mechanism.

6 Claims, 4 Drawing Sheets

METHOD OF CONVERTING AN INVERTED BOTTLE WATER DISPENSING SYSTEM FOR USE WITH AN AUTOMATIC BOTTLE REFILL SYSTEM

FIELD OF THE INVENTION

The present invention relates to a method of converting an inverted bottle water dispensing system for use with an automatic bottle refill system connected to a pressurized water service.

BACKGROUND OF THE INVENTION

Inverted bottle water dispensing systems utilize an inverted water bottle to feed water into a water dispensing reservoir. They are commonly used in business and government offices. The popularity of inverted bottle water dispensing systems is diminishing as users become familiar with some of the disadvantages associated with such water dispensing systems. The large bottles full of water are heavy to lift onto the water dispensing reservoir. Valuable storage space is taken up by a plurality of bottles; some of which are full and awaiting use and others of which are empty and awaiting pickup. Water quality is at times compromised by such factors as the length of storage prior to use and the temperature of the storage space in which they are stored.

Some dissatisfied users of inverted bottle water dispensing systems are converting their water dispensing equipment to automatic bottle refill systems that are connected to their buildings water service. An example of such an automatic bottle refill system is disclosed in U.S. Pat. No. 4,881,661 which issued to Jones in 1989. The Jones reference teaches the mounting of a float valve mechanism inside of the water bottle. As the water level in the water bottle falls, the valve member is moved away from the valve seat at the water inlet and water can enter the water bottle. As the water level increases due to water flowing through the water inlet, the float rises moving the valve member back into engagement with the valve seat to shut off the flow.

Automatic bottle refill systems directly address the disadvantages of inverted bottled water systems. There is no need to have more than one bottle, no need to ever remove the bottle and, therefore, no need to store a plurality of bottles. The inconvenience of continually replacing the bottles is totally avoided. However, automatic bottle refill systems have their own inherent disadvantages. When an inverted bottle water dispensing systems leaks, the worst that can happen is that the contents of the bottle leak onto the floor of the office building. When a water dispensing system equipped with an automatic bottle refill system leaks, the results are potentially catastrophic as water continuously flows from the leak until it is discovered. In view of the fact that many office buildings are largely deserted during the weekend, the potential for damage is substantial. In addition, inverted bottle water dispensing systems were never intended to be connected to a water service of a building. Should the float valve mechanism fail, most inverted bottle water systems will leak when subjected to the water pressure provided by the water service of a building. The Jones reference has attempted to address this problem by providing a water tight convoluted flexible seal between the neck of the inverted water bottle and the main frame stand.

U.S. Pat. No. 5,121,778, which issued to Elkay Manufacturing Company in 1992, represents the state of the art of one of the more popular inverted bottle water dispensing system. This patent discloses an open topped cooling reservoir positioned within a cabinet onto which is placed a funnel shaped mounting adaptor. The mounting adaptor has an annular ring on its upper portion in order to properly receive and support an inverted water bottle. An annular diaphragm element is coupled to the lower end of the funnel shaped mounting adaptor. This annular diaphragm element is used to seal the upper portion of the reservoir. In addition, the diaphragm element is used to support an upstanding feed tube. This upstanding feed tube cooperates with a special hygienic cap. The hygienic cap has a centrally positioned axially extending sleeve which receives the feed tube. The sleeve terminates in a repositionable plug. When the feed tube is inserted into the sleeve in the hygienic cap of the inverted water bottle, the feed tube engages the plug separates it from the sleeve enabling water to flow through the feed tube into the reservoir. A conduit extends from the mounting adaptor through the diaphragm and into the reservoir, to enable air to enter the reservoir. As will be apparent from this description there are a number of connections at which leakage may potentially occur as the system deteriorates through use. Of greater concern, however, are the many points through which water may pass in the event of a failure of the float valve, as water under pressure flows unimpeded through the water bottle and into the reservoir.

SUMMARY OF THE INVENTION

What is required is a method of converting an inverted bottle water dispensing system for use with an automatic bottle refill system connected to a pressurized water service.

According to the present invention there is provided a method of converting an inverted bottle water dispensing system for use with an automatic bottle refill mechanism. The inverted bottle water dispensing system to which the method relates an open topped cooling reservoir with a mounting adaptor for receiving an inverted bottle water disposed on top of the reservoir. The automatic bottle refill mechanism to which the method relates has a conduit connected to the inverted water bottle and connected to a float valve positioned within the inverted water bottle. The conduit is connected to a pressurized water service so that a continuous replenishing supply of water is supplied as permitted by the float valve. The method includes the step of permanently securing across the open top of the cooling reservoir a rigid closure cap to which a bottom of the mounting adaptor has been permanently secured. The rigid closure cap has a single access opening in liquid communication with the bottom of the mounting adaptor.

The preferred means of permanently securing the rigid closure cap to the cooling reservoir is by gluing with a suitable water resistant adhesive. In view of the fact that there is always a danger of a leak occurring as a result of someone attempting to remove the inverted bottle, it is also preferred that a neck of the inverted bottle be glued to the mounting adaptor.

Although beneficial results may be obtained through the teachings of the method, as described above, in that the inverted bottle dispensing system modified in accordance with the method is unlikely to leak, there is no absolute certainty that leakage will not occur. Even more beneficial results may, therefore, be obtained when a further step is taken of temporarily disabling the float valve of the automatic bottle refill mechanism and subjecting the inverted water bottle system to direct pressure from a building water service, thereby simulating a condition of float valve failure.

It is preferred that the internal parts in the reservoir made redundant by the rigid closure cap be removed prior to the rigid closure cap being permanently fastened in place. It is, of course, not essential that this be done.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred method of converting an inverted bottle water dispensing system for use with an automatic bottle refill mechanism will now be described with reference to FIGS. 1 through 4.

Figure 1:
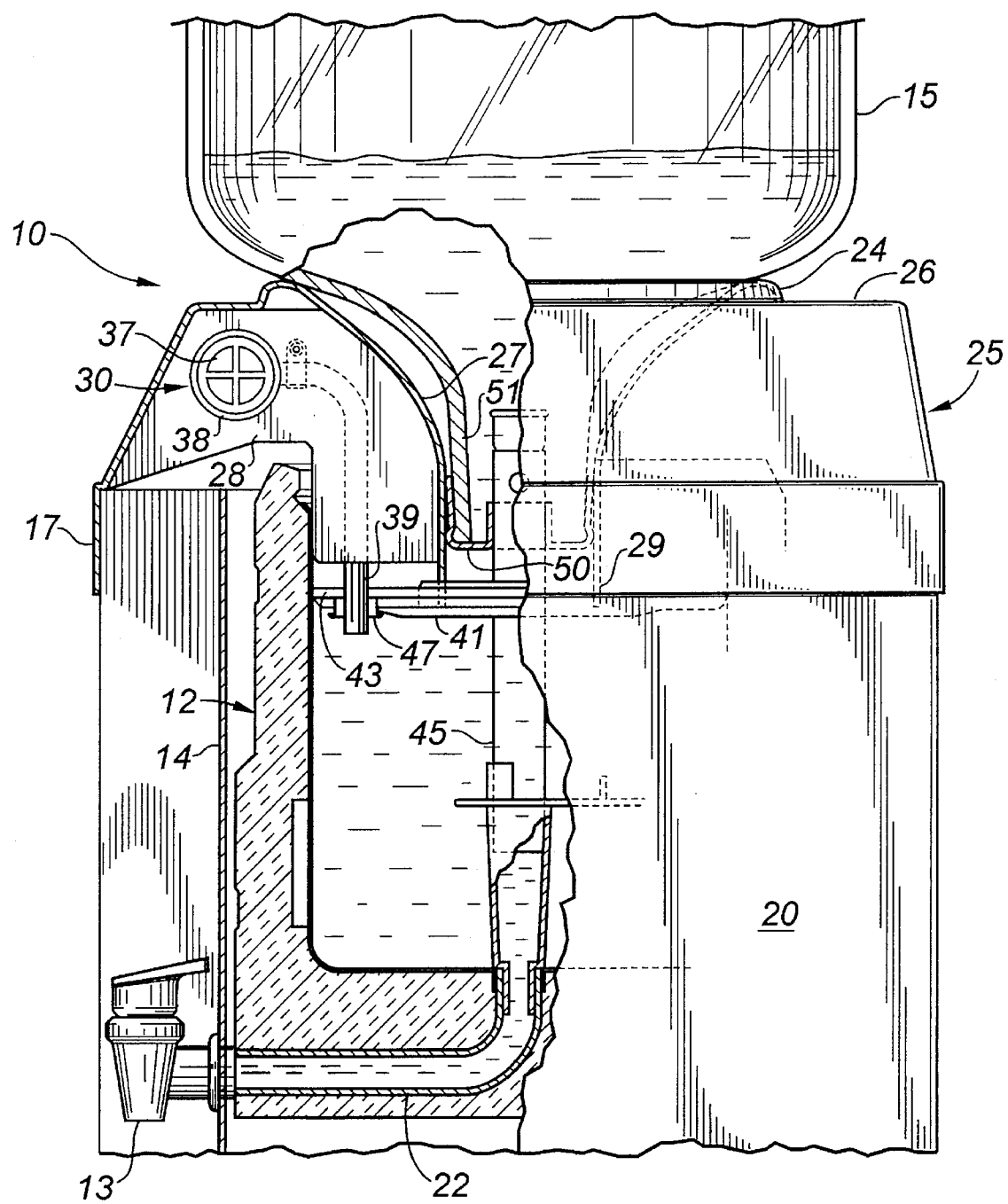
FIG. 1 is a side elevation view in partial section of an inverted bottle water dispensing system labelled as PRIOR ART.

Referring to FIG. 1, a PRIOR ART an inverted bottle water dispensing system generally indicated by reference numeral 10 is illustrated. Prior art inverted bottle water dispensing system 10 has an open topped cooling reservoir 12 disposed in a cabinet 20. A drain pipe extends from reservoir 12 to a dispensing faucet 13 positioned on a front panel 14 of cabinet 20. A mounting adaptor 25 is provided that has downwardly a extending sidewall that slides over cabinet 20. Mounting adaptor 25 has an annular ring 24 at its upper end 26. A depending funnel shaped entry portion 27 extends downwardly terminating at lower end 29 of mounting adaptor 25. Funnel shaped entry portion 27 of mounting adaptor 25 receives a neck 51 of an inverted water bottle 15 supported on annular ring 24. An hygienic cap 50 is positioned on neck 51 of inverted water bottle 15. Mounting adaptor 25 has internal stiffening ribs 28. A removable sealing diaphragm 41 with a peripheral sealing element 43 is positioned within reservoir 12 immediately below lower end 29 of mounting adaptor 25. Sealing diaphragm 41 supports upstanding feed tube 45. An air conduit 39 extends from a housing 38 for a filter element that serves as part of an air filter assembly 30 on mounting adaptor 25 through a grommet 47 in removable sealing diaphragm 41 and into reservoir 12.

Figure 2:
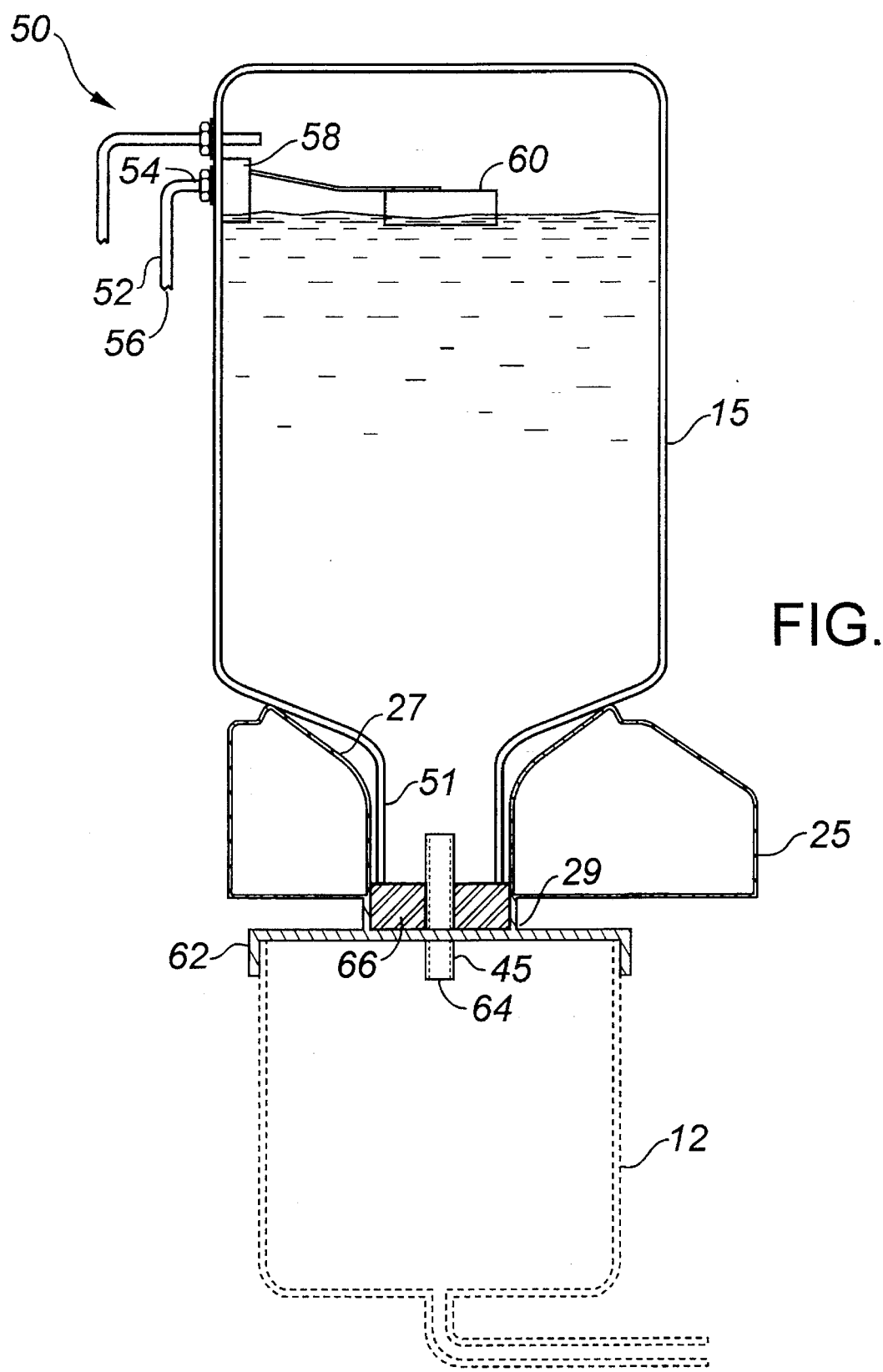
FIG. 2 is a side elevation view, in section, of the inverted bottle water dispensing system that has been modified in accordance/with the teachings of the present invention.

Referring to FIG. 2, an automatic bottle refill mechanism, generally identified by reference numeral 50 is illustrated. Automatic bottle refill mechanism 50 is of conventional construction in accordance with the teachings of U.S. Pat. No. 4,881,661. Automatic bottle refill mechanism 50 includes a conduit 52 having one end 54 connected to inverted water bottle 15. A remote end 56 of conduit 52 is connected to a pressurized water service of a building (not shown). Bottle end 54 of conduit 52 is connected to a float valve 58 positioned within inverted water bottle 15, and the flow through bottle end 54 of conduit 52 is controlled by float valve 58. Float valve 58 has a float 60. Float valve 58 is moved between an open position and a closed position by the movement of float 60 floating in water within inverted water bottle 15. Float valve 58 is conventional in construction and will not be further described.

The method lies in the conversion of PRIOR ART inverted bottle water dispensing system 10, as illustrated in FIG. 1, for use with automatic bottle refill mechanism 50. Referring to FIG. 2, the method includes permanently securing across the open top of the cooling reservoir 12 a rigid closure cap 62 to which bottom 29 of mounting adaptor 25 has been permanently secured. Rigid closure cap 62 has a single access opening 64 in liquid communication with bottom 29 of mounting adaptor 25. In this particular embodiment, a disk-like sealing element 66 is used to seal between neck 51 of inverted water bottle 15 and rigid closure cap 62. Feed tube 45 extends through and is supported by disk-like sealing element 66.

The manner of permanently securing rigid closure cap 62 to reservoir 12 can vary. It is preferred that rigid closure cap 62 by glued to cooling reservoir 12 by means of a suitable water resistant adhesive. It is also preferred that neck 51 of inverted water bottle 15 be glued to mounting adaptor 25.

Figure 3:
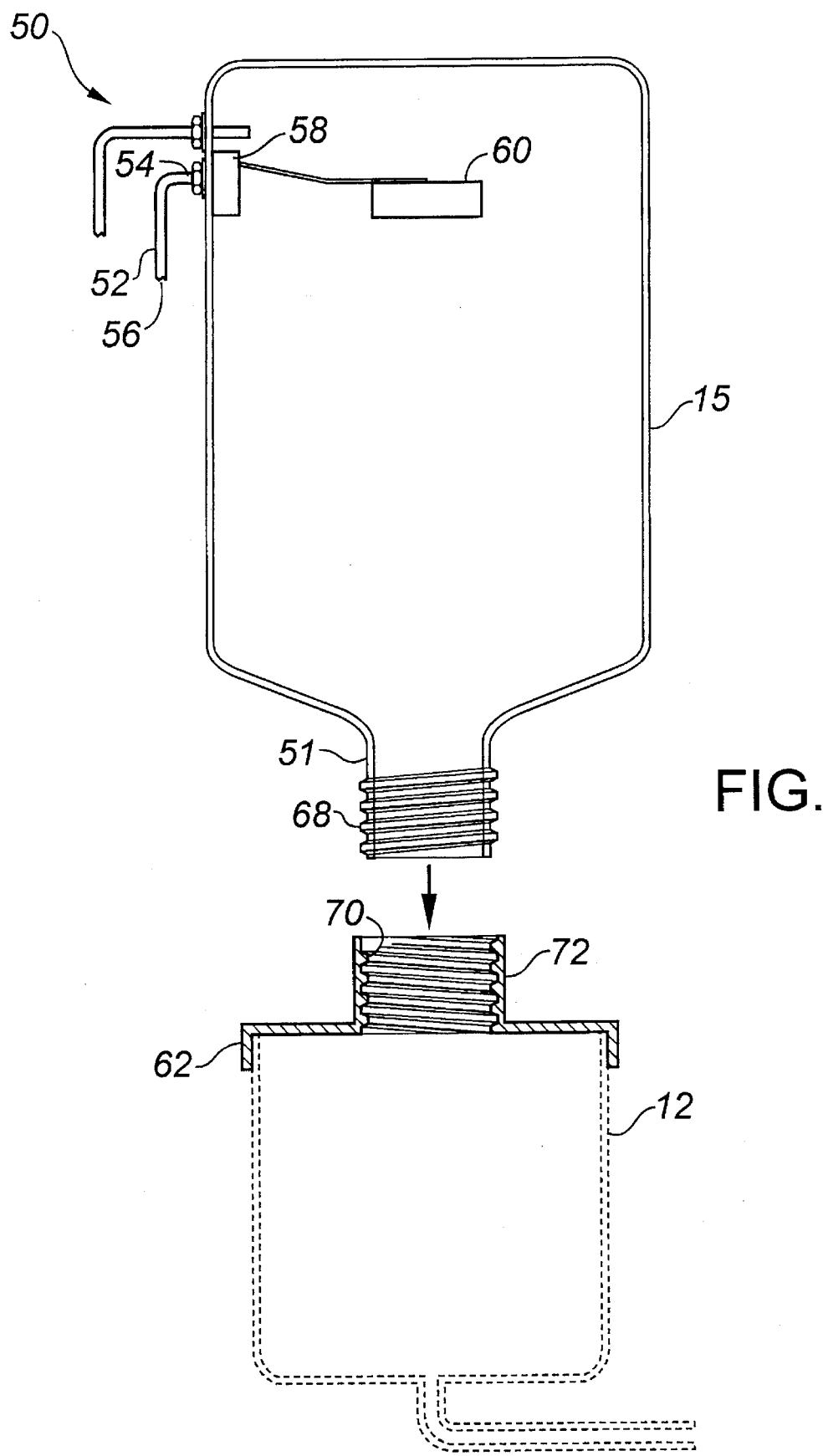
FIG. 3 is a side elevation view, in section, of a first alternative embodiment of inverted bottle water dispensing system that has been modified in accordance with the teachings of the present invention.
Figure 4:
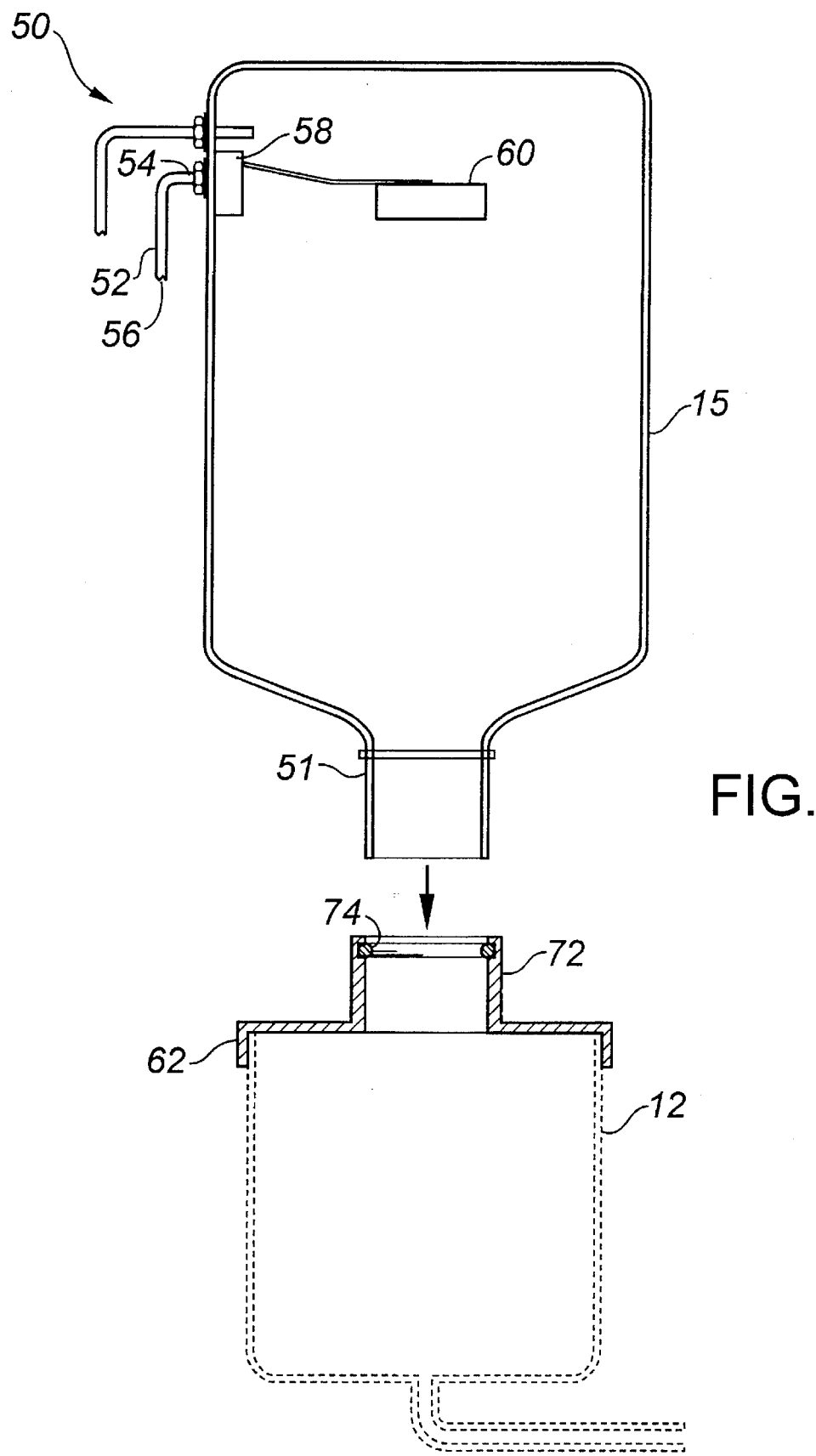
FIG. 4 is a side elevation view, in section, of a second alternative embodiment of inverted bottle water dispensing system that has been modified in accordance with the teachings of the present invention.

Referring to FIGS. 3 and 4, some alternative embodiments are illustrated to show that feed tube 45 is non-essential, as is funnel shaped entry portion 27. It should also be noted that disk-like sealing element can be replaced with alternative sealing means. Referring to FIG. 3, in this first alternative embodiment the sealing is achieved by external threads 68 on neck 51 of inverted water bottle 15 than engage mating internal threads 70 on a cylindrical form of mounting adaptor 72. Referring to FIG. 4, in this second alternative embodiment the sealing is achieved by an annular sealing surface 74 within cylindrical mounting adaptor 72.

It should be noted that in all of the embodiments reservoir 12 devoid of any internal components such as removable sealing diaphragm 41 or air conduit 39. It is preferred that these redundant components be removed prior to reservoir 12 being permanently sealed by rigid closure cap 62.

Although it is difficult to illustrate in drawings, it is preferred that float valve 58 of automatic bottle refill mechanism 50 be temporarily disabled in order to test the system prior to use. During testing inverted water bottle system 10, as modified, is subjected to direct pressure from a building water service. This simulates the most catastrophic failure which can occur, namely a failure of float valve 58.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of converting an inverted bottle water dispensing system for use with an automatic bottle refill mechanism, the inverted bottle water dispensing system having an open topped cooling reservoir with a mounting adaptor for receiving an inverted bottle water disposed on top of the reservoir, the automatic bottle refill mechanism having a conduit connected to the inverted water bottle and connected to a float valve positioned within the inverted water bottle, the conduit being connected to a pressurized water service, the method comprising the steps of:

permanently securing across the open top of the cooling reservoir a rigid closure cap to which a bottom of the mounting adaptor has been permanently secured, the rigid closure cap having a single access opening in liquid communication with the bottom of the mounting adaptor.

2. The method as defined in claim 1, having the rigid closure cap being glued by an adhesive to the cooling reservoir.

3. The method as defined in claim 1, having a neck of an inverted bottle glued by an adhesive to the mounting adaptor.

4. The method as defined in claim 1, including a further step of disabling the float valve of the automatic bottle refill mechanism and subjecting the inverted water bottle system to direct pressure from a building water service, thereby simulating a condition of float valve failure.

5. A method of converting an inverted bottle water dispensing system having an open topped cooling reservoir, a funnel shaped mounting adaptor for receiving an inverted bottle water dispenser disposed on top of the reservoir, a removable sealing diaphragm positioned within the reservoir immediately below the funnel shaped mounting adaptor, and an air conduit extending from the mounting adaptor through the removable sealing diaphragm and into the reservoir; for use with an automatic bottle refill mechanism in which a conduit is connected to the inverted water bottle and connected to a float valve positioned within the inverted water bottle, the conduit being connected to a pressurized water service, the method comprising the steps of:

removing from within the reservoir the removable sealing diaphragm and the air conduit;

permanently securing with adhesive across the open top of the cooling reservoir a rigid closure cap having an integrally formed mounting adaptor, the rigid closure cap having a single access opening extending through the mounting adaptor; and permanently securing with adhesive a neck of an inverted water bottle to the mounting adaptor, such that liquid in the inverted water bottle passes through the access opening in the rigid closure cap into the cooling reservoir.

6. The method as defined in claim 5, including a further step of disabling the float valve of the automatic bottle refill mechanism and subjecting the inverted water bottle system to direct pressure from a building water service, thereby simulating a condition of float valve failure to test for leakage.

* * * * *